(12) United States Patent
Qin et al.

(10) Patent No.: US 9,939,938 B2
(45) Date of Patent: Apr. 10, 2018

(54) DISPLAY PANEL WITH TOUCH DETECTING AND DISPLAY DEVICE (71) Applicant: BOE TECHNOLOGY GROUP CO., LTD., Beijing (CN)

(72) Inventors: Wei Qin, Beijing (CN); Jianing Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/519,536

(22) Filed: Oct. 21, 2014

(65) Prior Publication Data

US 2016/0041664 A1 Feb. 11, 2016

(30) Foreign Application Priority Data

Aug. 5, 2014 (CN) .......................... 2014 1 0381393

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC . G06F 2203/04103; G06F 2203/04111; G06F 3/041–3/0416; G06F 2203/04112
See application file for complete search history.

(56) References Cited

U.S. PATENT DOCUMENTS

| 2012/0154326 A1 | 6/2012 | Liu |
| 2013/0076691 A1* | 3/2013 | Liu ....................... G06F 3/0412 345/174 |
| 2014/0071360 A1* | 3/2014 | Chang ................... G06F 3/0412 349/12 |
| 2014/0125880 A1* | 5/2014 | Tsai ....................... G06F 3/0412 349/12 |
| 2014/0176491 A1 | 6/2014 | Zhao et al. |
| 2014/0285466 A1* | 9/2014 | Hayashi .................. G06F 3/044 345/174 |
| 2016/0041438 A1 | 2/2016 | Hu et al. |
| 2016/0041642 A1 | 2/2016 | Cheng et al. |

FOREIGN PATENT DOCUMENTS

| CN | 102609128 A | 7/2012 |
| CN | 103018992 A | 4/2013 |
| CN | 103034386 A | 4/2013 |
| CN | 103698949 A | 4/2014 |
| CN | 103761014 A | 4/2014 |

OTHER PUBLICATIONS

First Chinese Office Action dated Aug. 3, 2016; Appln. No. 201410381393.5.

\* cited by examiner

*Primary Examiner* — Sanghyuk Park
(74) *Attorney, Agent, or Firm* — Ladas & Parry LLP (57) ABSTRACT

A display panel and a display device are disclosed. The display panel comprises: a gate line and a common electrode structure extended along a first direction; and a data line extended along a second direction. the gate line, the common electrode structure, and the data line are intercrossed with each other and correspond to a sub-pixel; one end of the data line is connected with a source driving circuit and the other end of the data line is connected with a touch sensing terminal; and one end of the common electrode structure is connected with a common voltage input terminal and the other end of the common electrode structure is connected with a touch transmitting terminal.

19 Claims, 10 Drawing Sheets

DISPLAY PANEL WITH TOUCH DETECTING AND DISPLAY DEVICE

TECHNICAL FIELD

Embodiments of the present disclosure relate to a display panel and a display device.

BACKGROUND

With the development of display technology, touch panels are gradually spread and widely applied to products such as mobile phones, tablet computers, notebook computers and so on.

Currently, touch panels can be divided into resistive type, capacitive type, infrared type, surface acoustic wave type and the like according to the working principle, and can be divided into add-on touch panels, on-cell touch panels, in-cell touch panels and the like according to the structure. For instance, an add-on touch panel is a touch panel having touch function in which a touch screen and a display panel are separately produced and bonded together. The add-on touch panel has the defects of high production cost, low transmittance, large module thickness and the like. An in-cell touch panel is obtained by combining touch electrodes of a touch panel into, for instance, a liquid crystal display (LCD), not only can reduce the overall thickness of a module but also can greatly reduce the production costs of the touch panel, and hence is favored by major panel manufacturers.

Currently, a capacitive in-cell touch panel can be obtained by additionally disposing touch drive electrodes and touch sensing electrodes in a thin-film transistor liquid crystal display (TFT-LCD) panel. For instance, indium tin oxide (ITO) strip electrodes disposed on different layers and intercrossed with each other are manufactured on a surface of a TFT array substrate. The two layers of ITO strip electrodes are respectively used as touch drive electrodes and touch sensing electrodes for achieving the touch function.

Figure 1:
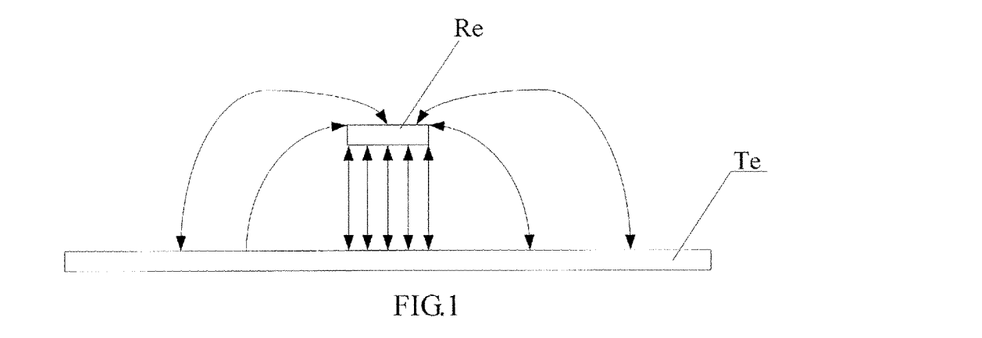
FIG. 1 is a schematic diagram showing the capacitance produced between a touch drive electrode and a touch sensing electrode.

FIG. 1 is a schematic diagram showing the capacitance produced between a touch drive electrode and a touch sensing electrode. As illustrated in FIG. 1, mutual capacitance Cm is produced between the touch drive electrode Te disposed on the upper portion and along one direction and the touch sensing electrode Re disposed on the lower portion and along the other direction. FIG. 1 is a sectional view perpendicular to the extension direction of Te. For instance, when a screen is touched by a finger, because the human body is of conductor, the touch of the finger will change the mutual capacitance Cm. A touch detecting device can determine whether there is touch and detect the position of the finger touch point by detecting the variation of current corresponding to the mutual capacitance Cm before and after the finger touch.

SUMMARY

At least one embodiment of the present disclosure provides a display panel, which comprises: a gate line and a common electrode structure that are extended along one direction; and a data line extended along the second direction. The gate line, the common electrode structure and the data line are intercrossed with each other and correspond to a sub-pixel; one end of the data line is connected with a source driving circuit and the other end of the data line is connected with a touch sensing terminal; and one end of the common electrode structure is connected with a common voltage input terminal and the other end of the common electrode structure is connected with a touch transmitting terminal.

At least one embodiment of the present disclosure provides a display device, which comprises the foregoing display panel.

At least one embodiment of the present disclosure provides a method for driving a display panel. The display panel comprises a gate line and a common electrode structure that are extended along a first direction, and a data line extended along a second direction; the gate line, the common electrode structure and the data line are intercrossed with each other and correspond to a sub-pixel; and a scanning time period of sub-pixels includes a display time period and a touch time period. The method comprises: in the display time period, applying a gate-on signal to the gate line, a data signal to the data line, and a common voltage to the common electrode structure; and in the touch time period, applying a touch driving signal to the common electrode structure and a gate-off signal to the gate line, not inputting the data signal to the data line, and detecting signal output caused by coupling of touch driving signal on the data line.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

Simple description will be given below to the accompanying drawings of the embodiments to provide a more clear understanding of the technical proposals of the embodiments of the present disclosure. It will be obvious to those skilled in the art that the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. It will be obvious to those skilled in the art that the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

Unless otherwise defined, the technical or scientific terms used herein have normal meanings understood by those skilled in the art. The words "first", "second" and the like used in the description and the claims of the patent application of the present disclosure do not indicate sequence, number or importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath". "left", "right" and the like only indicate the relative position relationship which is correspondingly changed when the absolute position of a described object is changed.

The current touch technology usually only supports touch operations of fingers, touch pens or the like as for screens of mobile phones, tablet computers or the like. In addition, with the demand in market development, for instance, due to the requirements on mobile payment and information security, fingerprint identification becomes more and more important. For instance, IPHONE 5S with fingerprint identification function was released by Apple Inc. in the second half of 2013 and obtained good market response. The inventor of the application realizes that touch panels not only having touch function but also having fingerprint identification function can satisfy the market needs, and moreover as for equipment with touch panels such as mobile phones, can remove the needs for a fingerprint identification equipment independently provided. Therefore, the production costs can be saved and the application field of products can be widened.

Currently, the LCD technologies capable of achieving wide viewing angle mainly include in-plane switching (IPS) technology and advanced super dimension switch (ADS) technology. The ADS technology is to form a multi-dimensional electric field by electric fields produced on edges of slit electrodes in the same plane and electric fields produced between a slit electrode layer and a plate electrode layer, so that liquid crystal molecules in all the alignments over electrodes and between slit electrodes in a liquid crystal cell can be rotated, and hence the working efficiency of liquid crystals and the light transmittance can be improved. The ADS technology can improve the image quality of TFT-LCD products and has the advantages of high resolution, high transmittance, low power consumption, wide viewing angle, high aperture ratio, low chromatic aberration, no push Mura and the like. High aperture ratio ADS (H-ADS) is an important implementation mode of the ADS technology.

Figure 2:
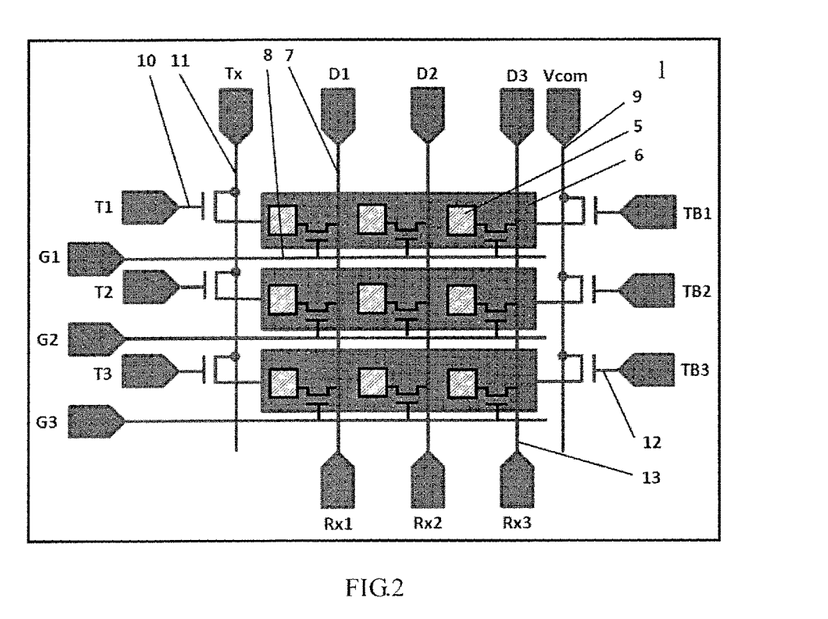
FIG. 2 is a plane view of a display panel provided by one embodiment of the present disclosure.

FIG. 2 is a plane view of a display panel provided by one embodiment of the present disclosure. The display panel provided in the embodiment, for instance, is of ADS type, but the present disclosure is not limited thereto.

The display panel 1 comprises a pixel array. The pixel array includes a plurality of (e.g., n) horizontally extended gate lines 8, a plurality of (e.g., m) vertically extended data lines 7 and a plurality of (e.g., n) horizontally extended common electrode structures 6. The gate lines 8 and the data lines 7 are intercrossed with each other to define a plurality of sub-pixel units, for instance, arranged in an array. For instance, each sub-pixel unit includes a TFT acting as a switching element and a pixel electrode 5 and a common electrode 16 that are configured to control the deflection of liquid crystals. For instance, as for the TFT of each sub-pixel, acting as the switching element, a gate electrode thereof is electrically connected with the corresponding gate line 8; a source electrode thereof is electrically connected with the corresponding data line 7; a drain electrode is electrically connected with the corresponding pixel electrode 5; and the TFT is switched on when, for instance, a high level signal is applied to the gate electrode, so that the corresponding data line 7 is electrically connected with the pixel electrode 5, and hence the pixel electrode 5 can be electrically charged. For instance, common electrodes 16 disposed in the same row of sub-pixel units are directly connected with each other to form a horizontally extended common electrode structure 6 (as shown in FIG. 5(a)), or all the common electrodes in the same row of sub-pixel units are connected to a common electrode line corresponding to the present row of sub-pixel units to form a horizontally extended common electrode structure 6 (as shown in FIG. 5(b)).

In the embodiment as shown in FIG. 2, an individual gate line 8 and an individual common electrode structure 6 are provided for each row of sub-pixels, and an individual data line is provided for each column of sub-pixels. However, the present disclosure is not limited to this kind of array structure. For instance, the display panel provided by at least one embodiment of the present disclosure may adopt a double-gate line structure, in which two gate lines are provided for each row of sub-pixels and respectively configured to drive half of sub-pixel units; and correspondingly, one data line is provided for every two columns of sub-pixels.

As illustrated in FIG. 2, in the display panel provided in the embodiment, a beginning end (the left end in the figure) of each gate line 8 is connected with a corresponding gate driving circuit G (G1, G2, G3 . . . ); one end (for instance, the upper end in the figure) of each data line 7 is connected with a source driving circuit D (D1, D2, D3 . . . ) and the other end (for instance, the lower end in the figure) is connected with a touch detection circuit (for instance, a touch chip) through a touch sensing terminal Rx (Rx1, Rx2, Rx3 . . . ); and one end (for instance, the left end in the figure) of each common electrode structure 6 is connected with a touch transmitting terminal Tx and the other end (for instance, the right end in the figure) is connected with a common voltage input terminal Vcom.

More specifically, the left end of each common electrode structure 6 is connected with the touch transmitting terminal Tx through a first control switch 10 controlled by a corresponding touch transmitting drive circuit T (T1, T2, T3 . . . ). The first control switch 10 is, for instance, a three-terminal control element such as a field effect transistor (FET) (for instance, a TFT); a source electrode of a first control switch 10 is connected with the touch transmitting terminal Tx; a drain electrode of the first control switch 10 is connected with a corresponding common electrode structure 6; and a gate electrode of the first control switch 10 is connected with a corresponding touch transmitting drive circuit T. Therefore, the control end of the first control switch 10 is connected with the corresponding touch transmitting drive circuit T. The touch transmitting drive circuit T outputs a first control signal to the first control switch 10. For instance, the first control switch 10 is an N-type metal oxide semiconductor (NMOS) transistor. When the first control signal is at a high level, the first control switch 10 is switched on; the common electrode structure 6 and the touch transmitting terminal Tx, corresponding to the first control switch 10 (or the touch transmitting drive circuit T), are electrically connected with each other; and hence the touch transmitting terminal Tx can apply a touch driving signal to the common electrode structure 6.

Correspondingly, the right end of each common electrode structure 6 is connected with the common voltage input terminal Vcom through a second control switch 12 controlled by a corresponding common voltage driving circuit TB (TB1, TB2, TB3 . . . ). The second control switch 12 is, for instance, a three-terminal control element such as an FET (for instance, a TFT); a source electrode of the second control switch 12 is connected with a corresponding common electrode structure 6; a drain electrode of the second control switch 12 is connected with the common voltage input terminal Vcom; and a gate electrode of the second control switch 12 is connected with a corresponding common voltage driving circuit TB. The common voltage driving circuit TB outputs a second control signal to the second control switch 12. For instance, the second control switch 12 is an NMOS transistor. When the second control signal is at a high level, the second control switch 12 is switched on; the common electrode structure 6 and the common voltage input terminal Vcom, corresponding to the second control switch 12 (or the common voltage driving circuit TB), are electrically connected with each other; and hence the common voltage input terminal Vcom can apply a common voltage to the common electrode structure 6.

Figure 3:
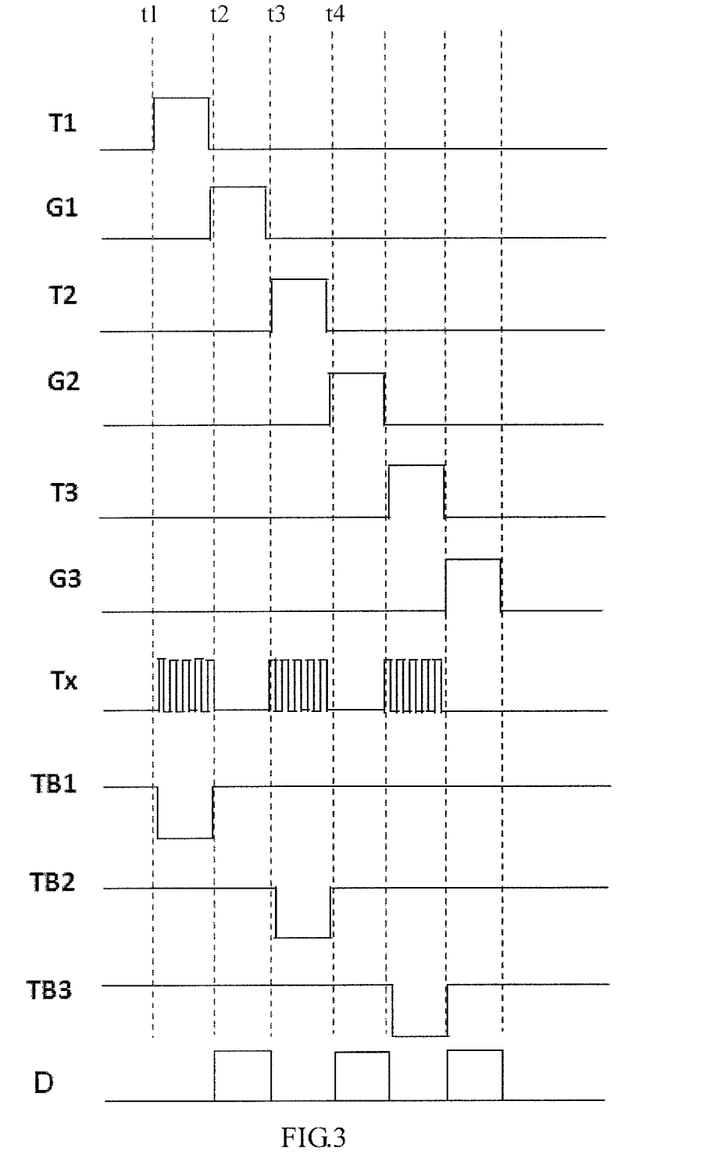
FIG. 3 is a signal timing diagram of a method for driving the display panel as shown in FIG. 2.

FIG. 3 is a signal timing diagram of a method for driving the display panel as shown in FIG. 2. The driving method provided in the embodiment is, for instance, a progressive scanning method, but the embodiments of the present disclosure are not limited thereto. The driving method provided in the embodiment may also be an interlaced scanning method. The scanning time period of each row of sub-pixels in the embodiment of the present disclosure includes a display time period and a touch time period, namely the time-sharing driving mode is adopted by the embodiment of the present disclosure. As the time-sharing driving mode is adopted, the embodiment of the present disclosure can avoid the mutual influence of the display process and the touch process as much as possible. The case that touch scanning is performed at first and hence display scanning is performed when each row of sub-pixels are scanned is given below as an example in illustration.

As illustrated in FIG. 3, in the process of scanning the first row of sub-pixels, at t1 moment, the touch transmitting drive circuit T1 outputs a high-level first control signal to the first control switch 10 in the first row; the gate driving circuit G1 outputs a low-level gate scanning signal (a gate-off signal) to the gate line in the first row; the common voltage driving circuit TB1 outputs a low-level second control signal to the second control switch 12 in the first row; no data signals are applied to all the data lines 7; and the touch transmitting terminal Tx outputs a touch driving signal. At this moment, the first control switch 10 in the first row is switched on; the common electrode structure 6 and the touch transmitting terminal Tx in the first row are electrically connected with each other; and hence the touch transmitting terminal Tx applies the touch driving signal to the common electrode structure 6. The TFTs of the first row of sub-pixel units are still in an off state, and hence the pixel electrodes 5 of the sub-pixel units are maintained in a non-charged state. The second control switch 12 in the first row is maintained in an off state, and the common electrode structure 6 and the common voltage input terminal Vcom are not electrically connected with each other. Therefore, at this point, the first row of sub-pixels of the display panel are in touch state; the common electrode structure 6 in the first row is taken as a touch drive electrode; the data lines 7 are taken as touch sensing electrodes; and the common electrode structure 6 in the first row and the data lines 7 are coupled with each other at mutually intercrossed positions to form corresponding small mutual capacitors. The mutual capacitors can be used as touch capacitors. When the display panel is not touched by the human body, a touch pen or the like, the capacitance of the touch capacitors in the first row is at a fixed value; when the display panel is touched by the human body, the capacitance of the touch capacitor at the touch position is affected and changed; and information such as current caused by the variation of the capacitance is detected and recorded by a touch detection circuit (for instance, a touch detection chip), connected with the data lines 7, through corresponding touch sensing terminal Rx. That is to say, signal output caused by the coupling of touch driving signals on the data lines 7 is detected, and hence the touch position in the first row of the pixel array can be determined.

When the time sequence proceeds to t2 moment, the touch transmitting drive circuit T1 outputs a low-level first control signal to the first control switch 10 in the first row; the gate driving circuit G1 outputs a high-level gate scanning signal (a gate-on signal) to the gate line in the first row; the common voltage driving circuit TB1 outputs a high-level second control signal to the second control switch 12 in the first row; and corresponding data signals are applied to all the data lines 7 by a source driving circuit D. At this moment, the first control switch 10 in the first row is switched off; the electrical connection between the common electrode structure 6 and the touch transmitting terminal Tx in the first row is cut off; all the TFTs in the first row of sub-pixels are switched on; data signals over the data lines 7 are applied to corresponding pixel electrodes 5 through corresponding TFTs, and hence the pixel electrodes 5 are electrically charged; the second control switch 12 in the first row is switched on; the common electrode structure 6 and the common voltage input terminal Vcom in the first row are electrically connected with each other; and hence the common voltage input terminal Vcom applies a common voltage to the common electrode structure 6 in the first row. Therefore, at this point, the first row of sub-pixels of the display panel are in the display state; there is voltage difference between the pixel electrode 5 applied with a data signal and the common electrode applied with the common voltage, in each sub-pixel in the first row, and hence certain electric field is produced; the electric field drives liquid crystal molecules corresponding to the sub-pixel to deflect; the polarization state of light running through the sub-pixel is controlled; and hence the function of adjusting the brightness can be achieved, and consequently the image display effect can be achieved. At this point, in order to save the electric energy, for instance, the touch transmitting terminal Tx can output a low level signal or no signal is outputted therefrom.

When the time sequence proceeds to t3 moment, the scanning time period of the first row of sub-pixels is over (ended); the touch transmitting drive circuit T1 outputs a low-level first control signal; the gate driving circuit G1 outputs a low-level gate scanning signal (a gate-off signal); the common voltage driving circuit TB1 outputs a high-level second control signal; and hence the first control switch 10 in the first row and the TFTs in the sub-pixel units are all in an off state, and the second control switch 12 is in an on state. Meanwhile, the scanning time period of the second row of sub-pixels begins from this moment.

At t3 moment, the touch transmitting drive circuit T2 outputs a high-level first control signal to a first control switch 10 in the second row; the gate driving circuit G2 outputs a low-level gate scanning signal (a gate-off signal) to the gate line in the second row; the common voltage driving circuit TB2 outputs a low-level second control signal to the second control switch 12 in the second row; the source driving circuit D does not apply data signals to all the data lines 7; and the touch transmitting terminal Tx outputs a touch driving signal. At this moment, the first control switch 10 in the second row is switched on; the common electrode structure 6 in the second row and the touch transmitting terminal Tx are electrically connected with each other, and hence the touch transmitting terminal Tx applies a touch driving signal to the common electrode structure 6; the TFTs in the second row of sub-pixel units are still maintained in an off state, and hence pixel electrodes 5 of the TFTs are maintained in a non-charged state; the second control switch 12 in the second row is maintained in an off state; and the common electrode structure 6 and the common voltage input terminal Vcom are not electrically connected with each other. Therefore, at this point, the second row of sub-pixels of the display panel are in the touch state; the common electrode structure 6 in the second row is taken as a touch drive electrode, and the data lines 7 are taken as touch sensing electrodes; the common electrode structure 6 in the second row and the data lines 7 are coupled with each other at intercrossed positions to form corresponding small mutual capacitors. The mutual capacitors can be used as touch capacitors. When the display panel is not touched by the human body, a touch pen or the like, the capacitance of the touch capacitors in the second row is at a fixed value; when the display panel is touched by the human body, the capacitance of the touch capacitors at touch positions is affected and changed; and information such as current caused by the variation of the capacitance is detected and recorded by a touch detection circuit (for instance, a touch detection chip), connected with the data lines 7, through corresponding touch sensing terminal Rx. That is to say, signal output caused by the coupling of touch driving signals on the data lines 7 is detected, and hence the touch position in the second row of the pixel array can be determined.

When the time sequence proceeds to t4 moment, the touch transmitting drive circuit T2 outputs a low-level first control signal to the first control switch 10 in the second row; the gate driving circuit G2 outputs a high-level gate scanning signal (a gate-on signal) to the gate line in the second row; the common voltage driving circuit TB2 outputs a high-level second control signal to the second control switch 12 in the second row; and the source driving circuit D applies corresponding data signals to all the data lines 7. At this moment, the first control switch 10 in the second row is switched off; the electrical connection between the common voltage structure 6 in the second row and the touch transmitting terminal Tx is cut off; all the TFTs in the second row of sub-pixels are switched on; data signals over the data lines 7 are applied to corresponding pixel electrodes 5 through corresponding TFTs, and hence the pixel electrodes 5 are electrically charged; the second control switch 12 in the second row is switched on; the common electrode structure 6 and the common voltage input terminal Vcom in the second row are electrically connected with each other; and hence the common voltage input terminal Vcom applies a common voltage to the common electrode structure 6 in the second row. Therefore, at this point, the second row of sub-pixels of the display panel are in the display state; there is voltage difference between the pixel electrode 5 applied with a data signal and a common electrode applied with the common voltage, in each sub-pixel in the second row, and hence certain electric field is produced; the electric field drives liquid crystal molecules of the sub-pixel to deflect; the polarization state of light running through the sub-pixel is controlled; and hence the function of adjusting the brightness can be achieved, and consequently the image display effect can be achieved. At this point, in order to save the electric energy, for instance, the touch transmitting terminal Tx can output a low level signal or no signal is outputted therefrom.

The rest rows of sub-pixels, from the third row of sub-pixels to the nth row of sub-pixels, of the display panel as shown in FIG. 2 are scanned in the same mode. Thus, the display operations of these rows of sub-pixels achieve the display of one frame of image on the whole; correspondingly, touch operation data detected from these rows of sub-pixels also achieve "one frame" of touch operation "image" on the whole. The touch operation "image" is a two-dimensional (2D) image and not only can be used for system operation but also can be used as data input, for instance, used for fingerprint identification.

In the above progressive scanning method, touch scanning is performed at first and display scanning is performed next in the scanning process of each row of sub-pixels. However, display canning may be performed at first and touch scanning is performed next. The embodiments of the present disclosure shall not be limited to the sequence.

When the interlaced scanning method is used for the embodiment of the present disclosure, the scanning time period of each row of sub-pixel also includes a display time period and a touch time period. Compared with the progressive scanning method, although the scanning sequence of the sub-pixel rows is changed in the interlaced scanning method, the scanning mode of the same row of sub-pixels is not changed. The corresponding scanning time period also includes the display time period and the touch time period. No further description will be given here for simplicity.

Figure 4:
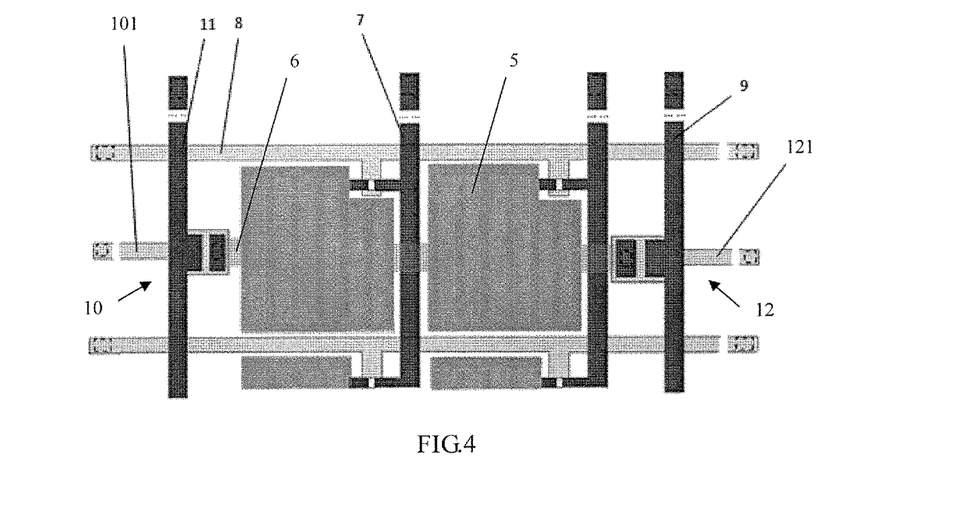
FIG. 4 is an exemplary array substrate structure of the display panel provided in the embodiment as shown in FIG. 2.

FIG. 4 is an exemplary array substrate structure of the display panel provided in the embodiment as shown in FIG. 2. Two sub-pixel units are illustrated in each row of the pixel array in the figure. But this is only for the purpose of description. The embodiments of the present disclosure shall not be limited thereto.

The array substrate of the display panel provided in the embodiment of the present disclosure comprises a plurality of horizontally extended gate lines 8 and a plurality of vertically extended data lines 7. The gate lines 8 and the data lines 7 are intercrossed with each other to define sub-pixel units arranged in, for instance, a matrix. Each sub-pixel unit includes a TFT acting as a switching element and a pixel electrode 5 and a common electrode (disposed below the pixel electrode 5 in the drawing and accordingly not shown in the drawing) configured to control the arrangement of liquid crystals; a gate electrode of the TFT of each sub-pixel unit and a corresponding gate line are integrally formed; a source electrode of the sub-pixel unit and a corresponding data line are integrally formed; and a drain electrode of the sub-pixel and a corresponding pixel electrode 5 are integrally formed. In each sub-pixel unit, the pixel electrode 5 is disposed above the common electrode 16 (as shown in FIGS. 2 and 4). For instance, the pixel electrode 5 may be a slit electrode including a plurality of parallel slits.

Figure 5:
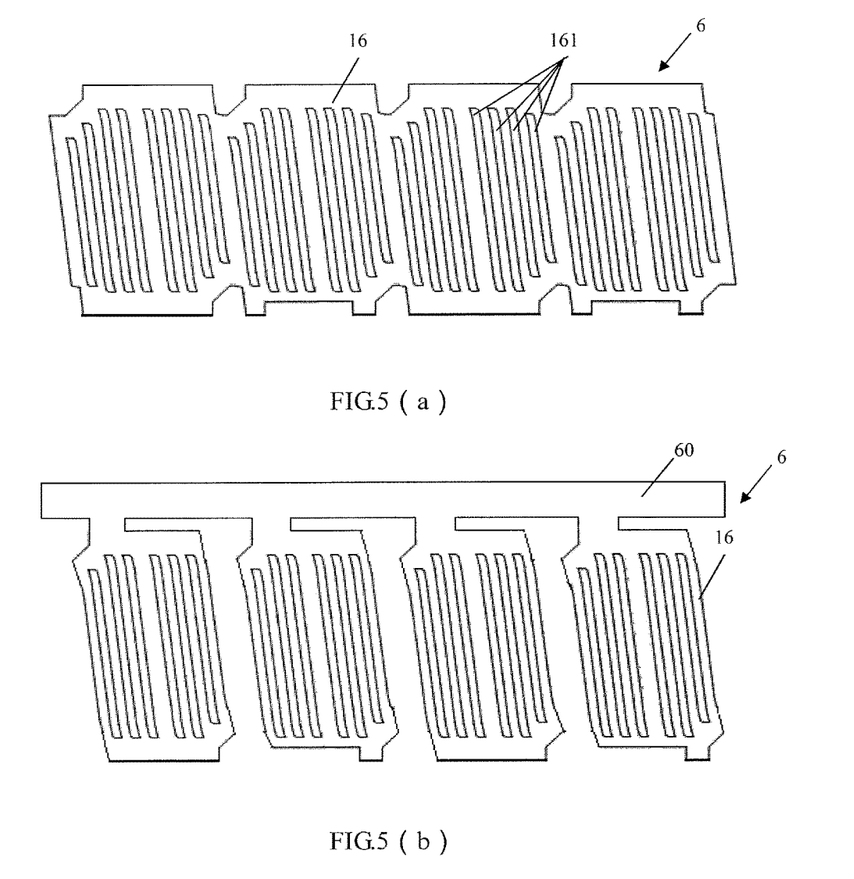
FIG. 5(a) is a schematic diagram of a common electrode structure formed by the direct connection of common electrodes.
FIG. 5(b) is a schematic diagram of a common electrode structure formed by independent common electrodes and a common electrode line.

FIG. 5(*a*) is a schematic diagram of an example of a common electrode structure 6 formed by mutually connected common electrodes 16. As illustrated in FIG. 5(*a*), the common electrodes 16 of four sub-pixel units in the same row are electrically connected with each other to form a portion of one horizontally extended common electrode structure 6 in the pixel array. For instance, each common electrode 16 may be a plate electrode, or may be a slit electrode including a plurality of parallel slits 161.

FIG. 5(*b*) is a schematic diagram of an example of a common electrode structure 6 formed by mutually independent common electrodes 16 and a common electrode line 60 electrically connected with the common electrodes 16. As illustrated in FIG. 5(*b*), the common electrodes 6 of four sub-pixel units in the same row are mutually independent but are all electrically connected to one horizontally extended common electrode line 60 corresponding to this row of sub-pixels to form a horizontally extended common electrode structure 6. For instance, each common electrode 16 may be a plate electrode, or may be a slit electrode including a plurality of parallel slits 161.

For instance, the pixel electrodes 5 and the common electrodes 16 may be made of a transparent conductive material (e.g., indium tin oxide (ITO), indium zinc oxide (IZO) or the like), and hence the aperture ratio and the transmittance of sub-pixel units can be improved.

With reference to FIG. 4 again, both ends of the common electrode structure 6 are respectively connected with the first control switch 10 and the second control switch 12. Both the first control switch 10 and the second control switch 12 are TFTs, for instance, N-type TFTs. For example, the drain electrode of the first control switch 10 is connected with the common electrode structure 6; the source electrode is connected with a touch transmitting terminal signal line 11; and the gate electrode is connected with a corresponding touch transmitting drive line 101. For example, the source electrode of the second control switch 12 is connected with the common electrode structure 6; the drain electrode is connected with a common voltage input line 9; and the gate electrode is connected with corresponding common voltage drive line 121. For instance, the touch transmitting terminal signal line 11, the common voltage input line 9 and the data line 7 may be provided on the same layer and, for instance, made of a metallic material (e.g., aluminum, aluminum alloy or the like); and the common electrode structure 6, the common electrode 16, the gate line 8, the touch transmitting drive line 101 and the common voltage drive line 121 may be formed on another layer and, for instance, made of a transparent conductive material (e.g., ITO, IZO or the like).

Based on the above structure, corresponding first control switches 10 and corresponding second control switches 12 may be formed when a TFT of a pixel structure of a sub-pixel unit is formed, so that the process for manufacturing the array substrate of the display panel provided in the embodiment of the present disclosure can be compatible with the traditional process of an array substrate, and hence the production costs can be saved.

Figure 6:
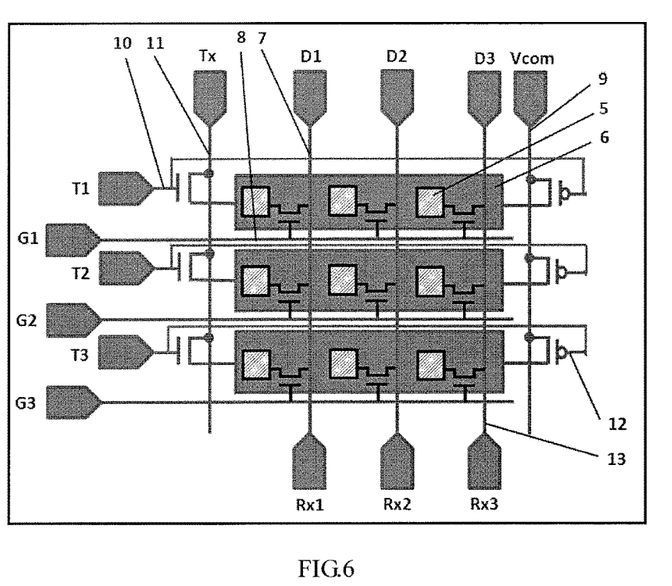
FIG. 6 is a plane view of a display panel provided in another embodiment of the present disclosure.

FIG. 6 is a plane view of a display panel provided in another embodiment of the present disclosure. The differences between the display panel provided in the embodiment and the embodiment as shown in FIG. 2 are described below. The display panel provided in the embodiment as shown in FIG. 6 does not comprise a common voltage driving circuit TB disposed on the right side; the type of the second control switch 12 is opposite to the type of the first control switch 10, namely signals required to switch on the first control switch 10 and the second control switch 12 have opposite phases, for instance, the first control switch 10 is an NMOS transistor but the second control switch is a P-type metal oxide semiconductor (PMOS) transistor, or the first control switch 10 is a PMOS transistor but the second control switch is an NMOS transistor; and a gate electrode of the second control switch 12 is electrically connected with a touch transmitting drive circuit T (T1, T2, T3 . . . ) disposed on the left side, namely controlled by the corresponding touch transmitting drive circuit T (T1, T2, T3 . . . ) as well.

The signal timing sequence of the example of the method for driving the display panel provided in the embodiment as shown in FIG. 6 is basically the same as that of the embodiment as shown in FIG. 2, except that signals outputted by the common voltage driving circuits TB are not included. Because the type of the second control switch 12 is opposite to the type of the first control switch 10, signals from the same touch transmitting drive circuit T allow the working state (on or off) of the second control switch 12 to be opposite to the working state (off or on) of the first control switch 10, and hence error operations caused by the situation that the common electrode structure 6 of each row is connected with the touch transmitting terminal Tx and the common voltage input terminal Vcom at the same time can be avoided.

In the embodiments as shown in FIGS. 2 and 6, the gate lines of the display panel adopt a single-side drive mode, namely the gate driving circuit G (G1, G2, G3 . . . ) is only disposed on one side (e.g., the left side), and meanwhile the touch transmitting drive circuit T (T1, T2, T3 . . . ) is also disposed on one side (e.g., the left side). The gate driving circuit G and the touch transmitting drive circuit T may be disposed on the same side (as shown in FIGS. 2 and 6) and may also be disposed on different sides (not shown). In the latter exemplary arrangement, if the display panel is also provided with the common voltage driving circuit TB, the gate driving circuit G and the common voltage driving circuit TB may be disposed on the same side.

When the gate driving circuits G and the touch transmitting drive circuits T are disposed on the same side, the gate driving circuits G and the touch transmitting drive circuits T may be respectively disposed in independent chips (ICs) or may be disposed in a same drive chip. In the timing diagram of the progressive driving method as shown in FIG. 3, as can be seen, the touch transmitting drive circuits T1, T2, T3 . . . and the gate driving circuits G1, G2, G3 . . . are alternately switched on/off and can adopt the same signal type, and therefore the touch transmitting drive circuits can be achieved by means of gate driving circuits. For instance, as for the gate driving circuits in cascade connection in sequence in the gate drive IC, ones disposed at odd positions (or even positions) may be used as the touch transmitting drive circuits T of the above embodiment, and ones disposed at even positions (or odd positions) may be used as the gate driving circuits G. The setting mode can be easily achieved and the production costs can be reduced.

Figure 7:
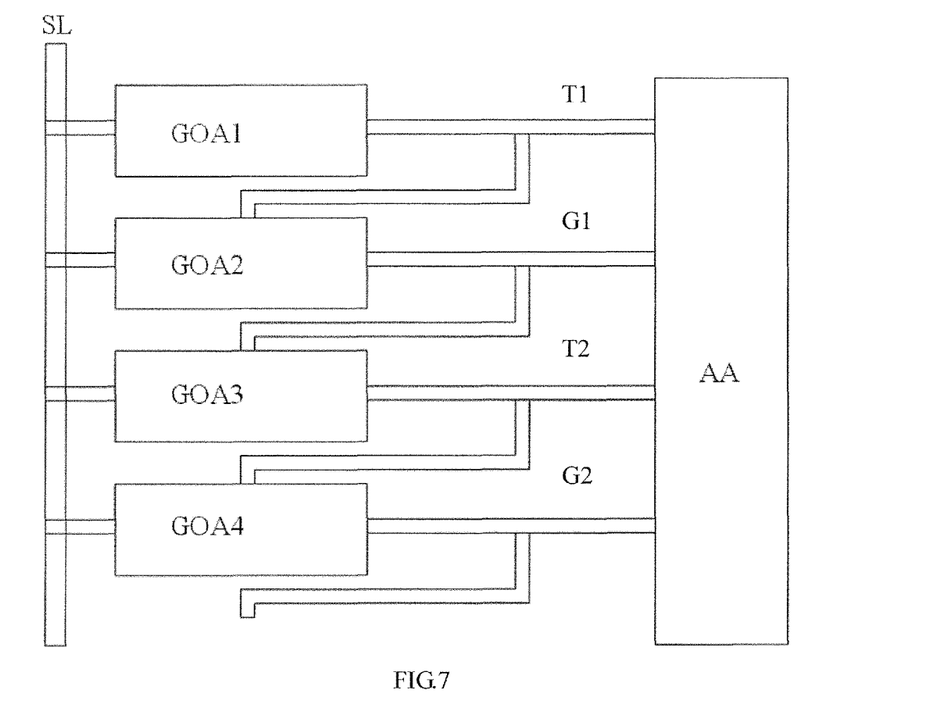
FIG. 7 is a schematic diagram of an example of a gate driving element in the embodiment of the present disclosure.

FIG. 7 is a schematic structural view of a gate driving element of the embodiments of the present disclosure. The gate driving element adopts gate-driver on array (GOA) driving circuit technology. In the technology, gate driving circuits are directly formed on an array substrate, and hence the production costs can be reduced. The present disclosure is not limited to the exemplary structure.

As illustrated in FIG. 7, the gate driving element is disposed on the edge, outside a display area (an AA area), of the display panel and includes a signal line SL and a plurality of GOA units in cascade connection. An output end of a GOA unit disposed at an odd position is connected with a touch transmitting drive line and configured to output a first control signal, namely the GOA unit is used as the touch transmitting drive circuit T. An output end of a GOA unit disposed at an even position is connected with a gate line and configured to output a gate scanning signal, namely the GOA unit is still used as the gate driving circuit G Each gate line is connected to one row of sub-pixels in the display area of the display panel for example. Moreover, an output end of each GOA unit is also connected to an input end of the next GOA unit through a lead so as to switch on the next GOA unit. For instance, in the working process of the display panel, the GOA units in cascade connection start work sequentially and output the first control signal and the gate scanning signal sequentially.

Figure 8:
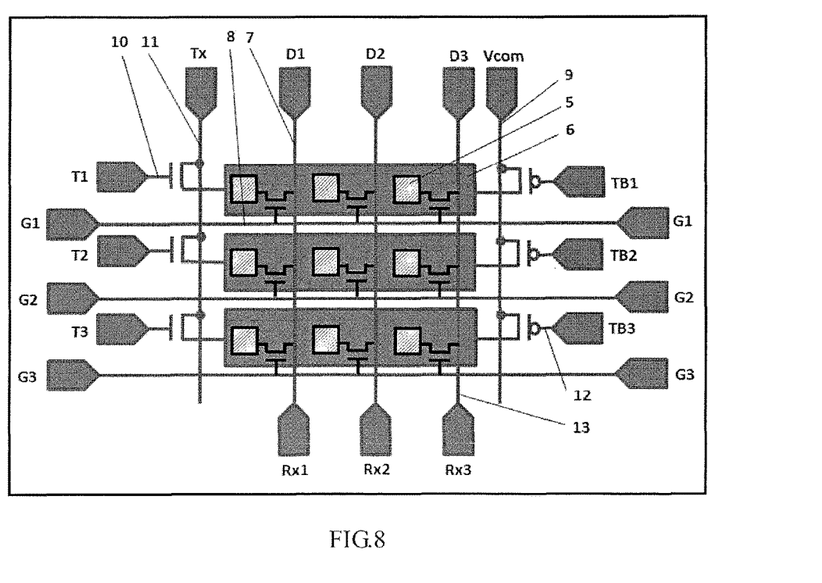
FIG. 8 is a plane view of a display panel provided in another embodiment of the present disclosure.

FIG. 8 is a plane view of a display panel provided in another embodiment of the present disclosure. The differences between the display panel provided in the present embodiment and the embodiment as shown in FIG. 2 are given below. Gate lines of the display panel provided in the embodiment as shown in FIG. 8 adopt a double-side drive mode, namely gate driving circuits G (G1, G2, G3 . . . ) are disposed on both sides of the display panel for the same gate line. Thus, the symmetry of gate scanning signals on both sides of the gate line can be achieved. In principle, when the gate scanning signals are more symmetrical, the overall display effect of the display panel become better, and hence the problem of uneven display caused by voltage delay on the gate line can be avoided. The type of the second control switch 12 is opposite to the type of the first control switch 10, namely signals required to switch on the first control switch 10 and the second control switch 12 have opposite phases. For instance, the first control switch 10 is an NMOS transistor but the second control switch is a PMOS transistor, or the first control switch 10 is a PMOS transistor but the second control switch is an NMOS transistor.

Figure 9:
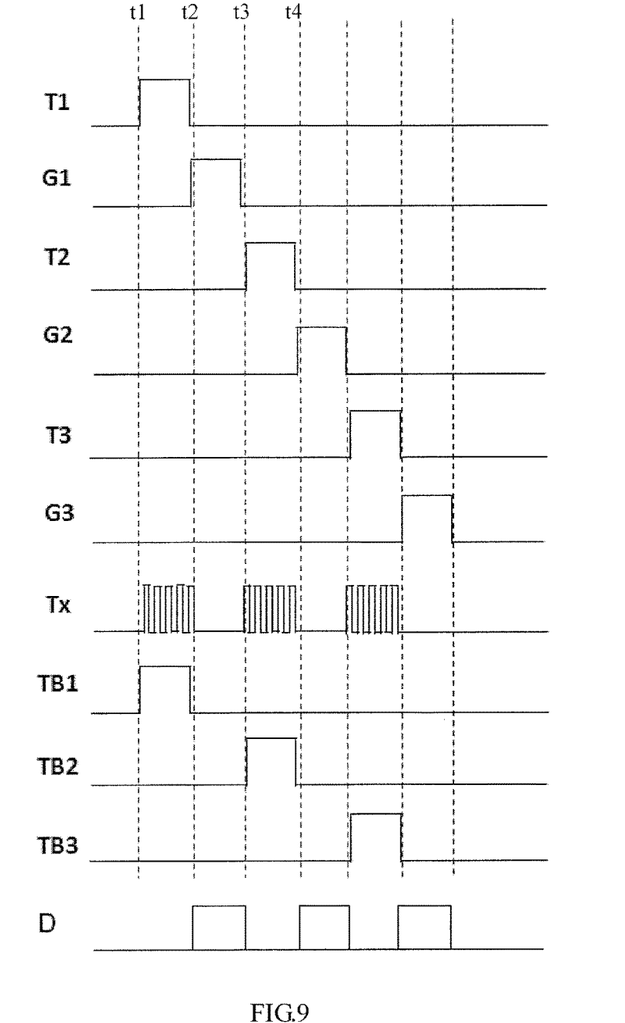
FIG. 9 is a signal timing diagram of a method for driving the display panel as shown in FIG. 8.

FIG. 9 is a signal timing diagram of the method for driving the display panel as shown in FIG. 8. The driving method provided in the embodiment is, for instance, a progressive scanning method, and the scanning time period of each row of sub-pixels includes a display time period and a touch time period. The difference from the signal timing diagram as shown in FIG. 3 is as follows: in the signal timing diagram as shown in FIG. 9, a second control signal outputted by the common voltage driving circuit TB (TB1, TB2, TB3 . . . ) is the same as a first control signal outputted by the touch transmitting drive circuit T (T1, T2, T3 . . . ); this difference corresponds to the variation that the type of the second control switch 12 is opposite to the first control switch 10. Thus, error operations caused by the situation that the common electrode structure in each row is connected with the touch transmitting terminal Tx and the common voltage input terminal Vcom at the same time can be avoided.

Similarly, when the scanning operations of all the sub-pixel rows of the display panel provided in the embodiment are completed, the display operations of these rows of sub-pixels achieve the display of one image frame on the whole. Correspondingly, touch operation data detected from these rows of sub-pixels also achieve "one frame" of touch operation "image" on the whole. The touch operation "image" is a two-dimensional (2D) image and not only can be used for system operation but also can be used as data input, for instance, used for fingerprint identification.

In the embodiment as shown in FIG. 8, the gate driving circuits G and the touch transmitting drive circuits T disposed on the left side of the display panel may be respectively disposed in independent chips (ICs) or may be disposed in the same drive chip. For instance, as for the gate driving circuits in cascade connection in sequence in a gate drive IC, ones disposed at odd positions (or even positions) may be used as the touch transmitting drive circuits T of the above embodiment, and ones disposed at even positions (or odd positions) may be used as the gate driving circuits of the above embodiment. Similarly, the gate driving circuits G and the common voltage driving circuits TB disposed on the right side of the display panel may be respectively disposed in independent chips (ICs) or may be disposed in the same drive chip. For instance, as for gate driving circuits in cascade connection in sequence in a gate drive IC, ones disposed at odd positions (or even positions) may be used as the common voltage driving circuits TB of the above embodiment, and ones disposed at even positions (or odd positions) may be used as the gate driving circuits of the above embodiment. The setting mode can be easily achieved, and hence the production costs can be reduced.

Figure 10:
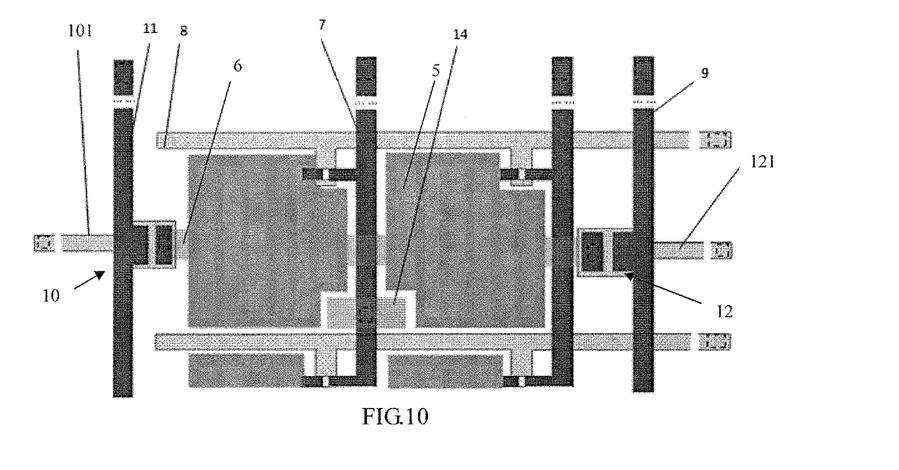
FIG. 10 is another exemplary array substrate structure of the display panel provided in the embodiment of the present disclosure.

FIG. 10 illustrates another exemplary array substrate structure of the display panel provided in the embodiment of the present disclosure. In FIG. 10, each row of an array pixel includes two sub-pixel units, but this is for the purpose of description. The embodiments of the present disclosure are not limited thereto. The difference between a pixel structure as shown in FIG. 10 and the pixel structure as shown in FIG. 4 is as follows: in each sub-pixel unit, a touch sensing extension electrode 14 is additionally formed and electrically connected with a data line 7 of the sub-pixel unit, for instance, intercrossed with the data line 7. The touch sensing extension electrode 14, for instance, may be overlapped or not overlapped with corresponding common electrode of the sub-pixel unit. As illustrated in FIG. 10, the touch sensing extension electrode 14 and the data line 7 are, for instance, formed on different layers and, for instance, may be formed on the same layer as the common electrode structure 6 and connected with the data line 7 via a through hole. At this point, the touch sensing extension electrode 14 may be made of a transparent conductive material. Or the touch sensing extension electrode 14 and the data line 7 are integrally formed, namely the touch sensing extension electrode 14 is formed from a branch of the data line 7. At this point, the touch sensing extension electrode 14 may be made of a metallic conductive material.

The touch sensing extension electrode 14 can further improve the touch sensitivity. If only the data line 7 is used as a touch sensing electrode, as the data line 7 is usually fine or narrow, corresponding touch sensing area is small accordingly, and hence signals produced by touch operations are also weak. Weak signal detection has high requirement on a touch control chip. The touch sensing extension electrode effectively increases the area of the touch sensing electrode and can be more sensitively applied to the detection of touch signals.

Figure 11:
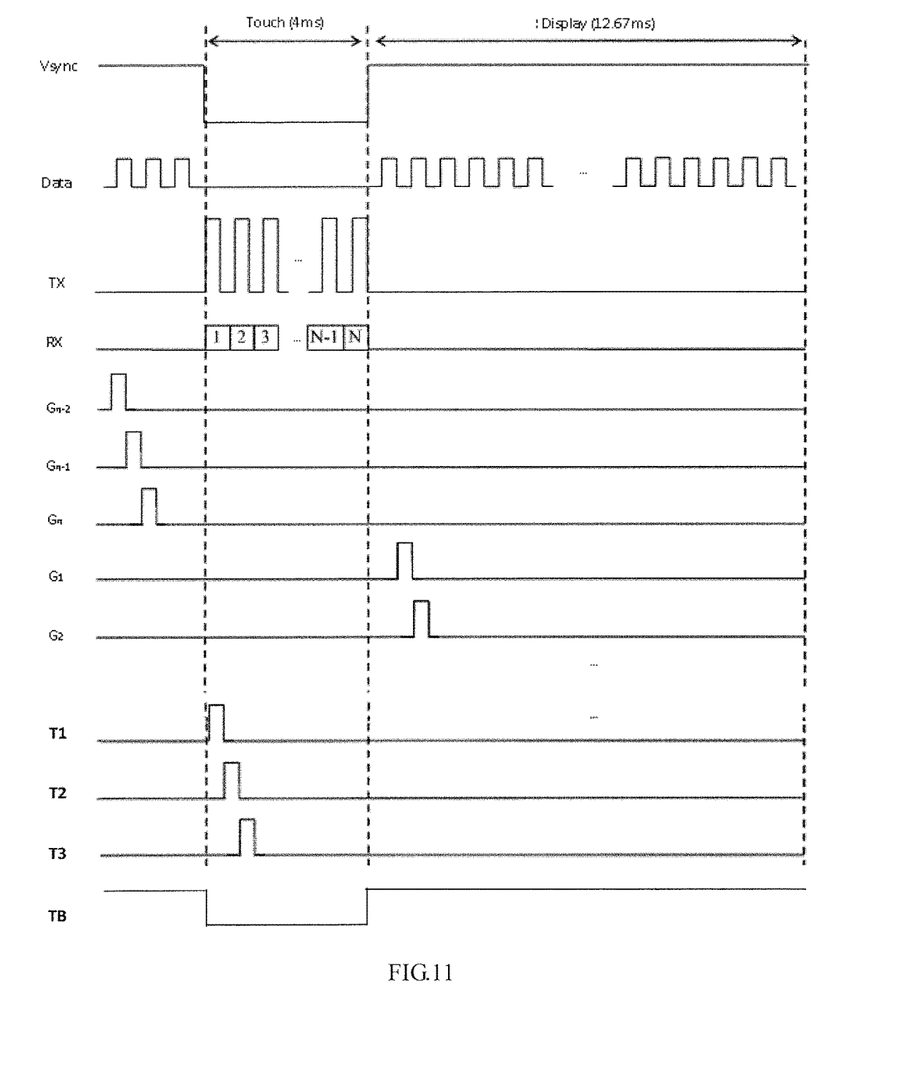
FIG. 11 is a signal timing diagram of another method for driving a display panel, provided in the embodiment of the present disclosure.

FIG. 11 is a signal timing diagram of another method for driving the display panel provided in an embodiment of the present disclosure. The driving method of the embodiment is, for instance, a progressive scanning method, but the embodiments of the present disclosure are not limited thereto. The driving method of the embodiment may also be an interlaced scanning method. Although the scanning time period of each row of sub-pixels in the embodiment includes a display time period and a touch time period, all the display time periods and the touch time periods are not continuously performed but alternately performed.

For instance, in the driving timing diagram of the embodiment as shown in FIG. 11, the time for displaying each frame (V-sync) of the display panel is divided into a display time period (Display) and a touch time period (Touch). For instance, in the driving timing diagram of the embodiment as shown in FIG. 11, the time for displaying one frame of image of the display panel is 16.67 ms; the former 4 ms is selected as the touch time period; and the rest 12.67 ms is selected as the display time period. But the present disclosure is not limited thereto. Or the display time period may be the former time period and the touch time period may be the latter time period. Of course, the duration of these two types of time may be appropriately adjusted according to the processing capability of the display panel. The embodiment of the present disclosure is not specifically limited.

In this embodiment, as for the display panel as shown in FIG. 2, in the display time period, the gate driving circuits G1, G2, G3 . . . of each row of gate lines in the display panel apply gate scanning signals sequentially so as to progressively switch on the sub-pixel units; meanwhile, the data signal lines in the display panel apply data signals so as to progressively electrically charge pixel electrodes of the sub-pixel units; the touch transmitting drive circuits T1, T2, T3 . . . all apply low-level first control signals to maintain all the first control switches to be in an off state and hence cut off the electrical connection between the touch transmitting terminal Tx and the common electrode structures 6; the common electrode driving circuits TB all apply high-level second control signals to maintain all the second control switches 12 to be in an on state and hence allow the common electrode structures 6 to be electrically connected with the common electrode input terminal Vcom; and a common voltage is applied to the common electrode structures 6. At this point, the display function of the display panel can be achieved, and hence one frame of image can be completely displayed.

Further, as for the display panel as shown in FIG. 2, in the touch time period, the gate driving circuits G1, G2, G3 . . . corresponding to each row of gate lines in the display panel do not apply gate scanning signals or apply low level signals, and hence the TFTs in the sub-pixel units of the pixel array are in an off state; no data signal is applied to the data signal lines in the display panel, but the touch detection circuits Rx detect coupling signal output over the data lines; the touch transmitting drive circuits T1, T2, T3 . . . corresponding to each row of common electrode structures in the display panel apply high-level first control signals sequentially to progressively switch on the first control switches 10, so that the common electrode structures in respective rows are sequentially connected with the touch transmitting terminal Tx; correspondingly, the touch transmitting terminals Tx apply touch driving signals to corresponding common electrode structures 6; and the common electrode driving circuits TB all apply low-level second control signals to maintain all the second control switches 12 to be in an off state and hence cut off the electrical connection between the common electrode structures 6 and the common voltage input terminal Vcom. Thus, the touch function of the display panel can be achieved and one frame of touch operation "image" can be obtained.

In the above embodiments, the case that the common electrode structure 6 of each row of sub-pixels is independently used as the touch drive electrode is given as an example. The embodiments of the present disclosure can achieve high-resolution touch display panels. Currently, the display resolution of display panels commonly available in the market is from 100 to 300 ppi, namely each inch includes 100 to 300 pixels. In the embodiment of the present disclosure, if the common electrode structure of each row of sub-pixels is taken as an independent touch drive electrode, when each pixel includes three sub-pixels (RGB), the density of touch capacitors (or touch sensors) shall be multiplied by 3 to reach 300 to 900 ppi. The touch resolution can satisfy the requirement of identifying fine differences of fingerprints.

Although the display resolution of an LCD is usually in a micrometer order, the touch resolution of a touch panel is usually in a millimeter order and can meet the general requirements on touch operations. Therefore, the common electrode structures 6 of some sub-pixel rows may be selected as the touch drive electrodes, for instance, the common electrode structures 6 of sub-pixels at an interval of one row or a plurality of rows are taken as the touch drive electrodes; or the common electrode structures 6 of two adjacent rows or more adjacent rows of sub-pixels are connected in parallel and taken as a touch drive electrode. In the display panel with low touch resolution provided by at least one embodiment of the present disclosure, the scanning time period of the sub-pixel rows still includes a display time period and a touch time period in display driving; as described above, the display time period and the touch time period may be continuously or alternately performed; and the driving method may also be a progressive scanning method or an interlaced scanning method.

Figure 12:
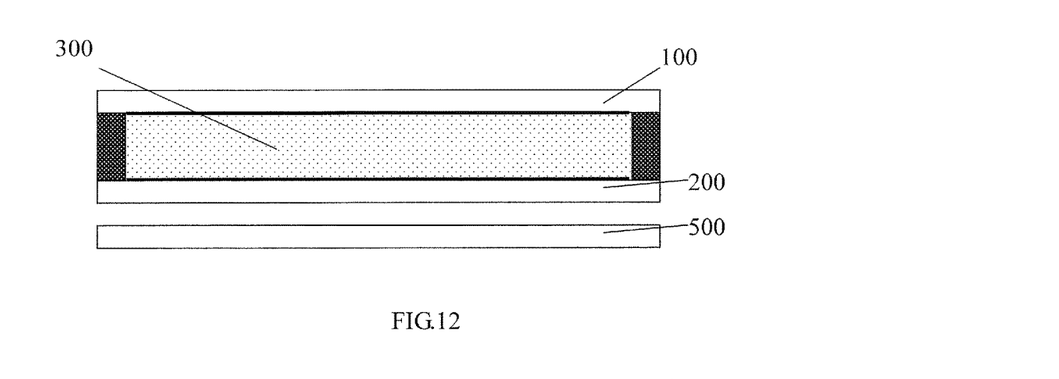
FIG. 12 is a schematic structural view of an LCD panel provided by at least one embodiment of the present disclosure.

The display panel provided in the embodiment of the present disclosure may be an LCD panel. FIG. 12 is a schematic structural view of an LCD panel provided in at least one embodiment of the present disclosure. As illustrated in FIG. 12, the LCD panel comprises: an opposing substrate 100, an array substrate 200 and a liquid crystal layer 300 disposed between the opposing substrate 100 and the array substrate 200. The opposing substrate 100 is, for instance, a color filter (CF) substrate. When a color filter structure is formed on the array substrate 200, no color filter structure is required to be formed on the opposing substrate 100. The structures such as the gate lines, the data lines, the common electrode structures and the like in the above embodiments are formed in the array substrate. The LCD panel may be of reflective type, transmissive type or transflective type. As for the latter two types, the LCD panel provided in the embodiment of the present disclosure further comprises a backlight 500.

Figure 13:
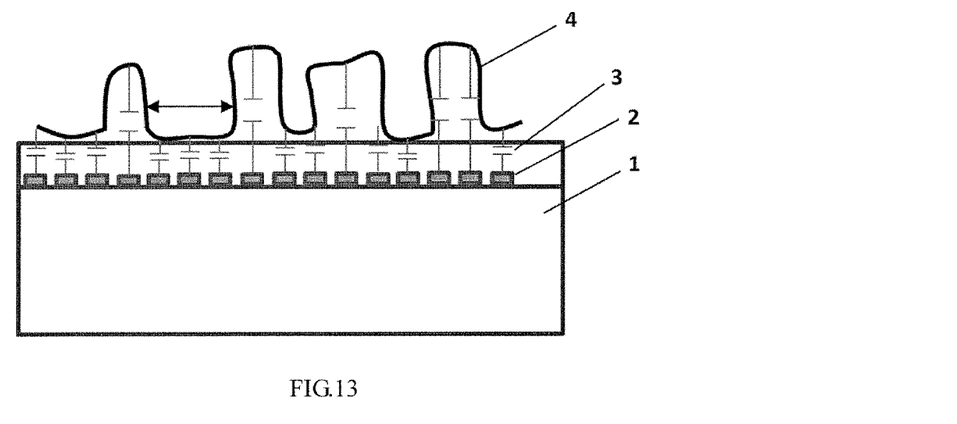
FIG. 13 is a schematic diagram illustrating the principle of fingerprint identification of the display panel provided in the embodiment of the present disclosure.

FIG. 13 is a schematic diagram illustrating the principle of fingerprint identification of the display panel provided in the embodiment of the present disclosure. In general, a texture is formed on a finger surface, and hence the finger surface has an uneven microstructure. As illustrated in FIG. 13, because a finger surface 4 is uneven, when the finger surface 4 touches the surface of the display panel 1, different sensing capacitors 3 are formed by projected portions and recessed portions on the finger surface 4 and touch circuit portions (including touch drive electrodes, touch sensing electrodes and the like) of the display panel 1 at different positions; touch capacitors 2 (sensors) between the touch drive electrodes and the touch sensing electrodes in the display panel 1 are affected by the sensing capacitors 3 and hence changed in capacitance; and information such as the variation of current caused by the change can be detected and outputted. Therefore, in at least one embodiment of the present disclosure, because sensing capacitors 2 in a high density are formed on the display panel 1, recessed portions and projected portions of fingerprints can be sensed, and hence touch images corresponding to the fingerprints can be obtained. The touch images may be applied to fingerprint identification. Fingerprint identification, for instance, can be further applied to safety verification.

At least one embodiment of the present disclosure further provides a display device, which comprises the display panel provided by any foregoing embodiment. The display device may be any product or component with display function such as a mobile phone, a tablet computer, a television, a display, a notebook computer, a digital picture frame, a navigator, a watch and the like.

The foregoing is only the preferred embodiments of the present disclosure and not intended to limit the scope of protection of the present disclosure. The scope of protection of the present disclosure should be defined by the appended claims.

What is claimed is:

1. A display panel, comprising:
    a gate line and a common electrode structure that are extended along a first direction; and
    a data line extended along a second direction,
    wherein the gate line, the common electrode structure, and the data line are intercrossed with each other and correspond to a sub-pixel;
    one end of the data line is connected with a source driving circuit and other end of the data line is connected with a touch sensing terminal;
    one end of the common electrode structure is connected with a common voltage input terminal and other end of the common electrode structure is connected with a touch transmitting terminal,
    wherein the one end of the common electrode structure is connected with the touch transmitting terminal through a first control switch;
    wherein the first control switch is connected with a touch transmitting drive circuit configured for outputting a first control signal to control the first control switch so as to connect or disconnect the common electrode structure and the touch transmitting terminal; and
    wherein one end of the gate line is connected with a gate driving circuit and the touch transmitting drive circuit is in cascade connection with the gate driving circuit.

2. The display panel according to claim 1, wherein the other end of the common electrode structure is connected with the common voltage input terminal through a second control switch.

3. The display panel according to claim 2, wherein the second control switch is connected with a common voltage driving circuit configured for outputting a second control signal to control the second control switch so as to connect or disconnect the common electrode structure and the common voltage input terminal.

4. The display panel according to claim 3, wherein the first control switch and the second control switch adopt transistors of a same type, and the first control signal and the second control signal have opposite phases; or the first control switch and the second control switch adopt transistors of opposite types, and the first control signal and the second control signal have a same phase.

5. The display panel according to claim 2, wherein the first control switch and the second control switch adopt transistors of opposite types; the second control switch is connected with the touch transmitting drive circuit; and the touch transmitting drive circuit is configured to output the first control signal so as to control the first control switch and the second control switch to be in opposite working states.

6. The display panel according to claim 1, wherein the other end of the common electrode structure is connected with the common voltage input terminal through a second control switch.

7. The display panel according to claim 6, wherein the second control switch is connected with a common voltage driving circuit configured for outputting a second control signal to control the second control switch so as to connect or disconnect the common electrode structure and the common voltage input terminal.

8. The display panel according to claim 7, wherein the first control switch and the second control switch adopt transistors of a same type, and the first control signal and the second control signal have opposite phases; or the first control switch and the second control switch adopt transistors of opposite types, and the first control signal and the second control signal have a same phase.

9. The display panel according to claim 6, wherein the first control switch and the second control switch adopt transistors of opposite types; the second control switch is connected with the touch transmitting drive circuit; and the touch transmitting drive circuit is configured to output the first control signal so as to control the first control switch and the second control switch to be in opposite working states.

10. The display panel according to claim 1, wherein the other end of the common electrode structure is connected with the common voltage input terminal through a second control switch; the second control switch is connected with a common voltage driving circuit configured for outputting a second control signal to control the second control switch so as to connect or disconnect the common electrode structure and the common voltage input terminal.

11. The display panel according to claim 10, wherein the first control switch and the second control switch adopt transistors of a same type, and the first control signal and the second control signal have opposite phases; or the first control switch and the second control switch adopt transistors of opposite types, and the first control signal and the second control signal have a same phase.

12. The display panel according to claim 1, comprising:
    a plurality of gate lines extended along the first direction;
    a plurality of common electrode structures extended along the first direction; and
    a plurality of data lines extended along the second direction,
    wherein the plurality of gate lines and the plurality of data lines are intercrossed with each other to define a sub-pixel array; one end of each of the plurality of data lines is connected with the source driving circuit and the other end is connected with a corresponding touch sensing terminal; and one end of each of the plurality of common electrode structures is connected with the common voltage input terminal and the other end is connected with the touch transmitting terminal.

13. The display panel according to claim 12, wherein each of the plurality of common electrode structures corresponds to one row of sub-pixels in the sub-pixel array.

14. The display panel according to claim 12, wherein each sub-pixel includes a common electrode and a pixel electrode;
common electrodes of one row of sub-pixel units are connected with a corresponding common electrode line to form one common electrode structure; or
common electrodes of one row of sub-pixel units are directly connected with each other to form one common electrode structure.

15. The display panel according to claim 14, wherein the common electrode and the pixel electrode are disposed on different layers.

16. A display device, comprising the display panel according to claim 1.

17. The display panel according to claim 1, further comprising a touch sensing extension electrode, wherein the touch sensing extension electrode is electrically connected with the data lines via a through hole, or the touch sensing extension electrode and the data lines are integrally formed, and
wherein the display panel includes a plurality of sub-pixels arranged in an array, and the touch sensing extension electrode is provided in each of the sub-pixels; the touch sensing extension electrode is inter-crossed with the data line and extends to both sides of the data line.

18. The display panel according to claim 16, wherein the touch sensing extension electrode is formed on the same layer as the common electrode structure, and is made of a transparent conductive material.

19. The display panel according to claim 1, wherein the gate driving circuit includes a plurality of GOA units in cascade connection; and
the GOA units at odd positions are connected to the touch transmitting drive circuit, the GOA unit at even positions are connected to the gate line; or the GOA units at even positions are connected to the touch transmitting drive circuit, the GOA unit at odd positions are connected to the gate line.

* * * * *